United States Patent
Lin et al.

(10) Patent No.: US 9,172,777 B2
(45) Date of Patent: Oct. 27, 2015

(54) HAIRPIN ELEMENT FOR IMPROVING ANTENNA BANDWIDTH AND ANTENNA EFFICIENCY AND MOBILE DEVICE WITH THE SAME

(71) Applicant: HTC Corporation, Taoyuan, Taoyuan County (TW)

(72) Inventors: Chia-Cheng Lin, Taoyuan (TW); Yu-Che Lin, Taoyuan (TW); Chung-Ting Hung, Taoyuan (TW); Kuo-Cheng Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 324 days.

(21) Appl. No.: 13/788,983

(22) Filed: Mar. 7, 2013

(65) Prior Publication Data

US 2014/0256388 A1    Sep. 11, 2014

(51) Int. Cl.
| | | |
|---|---|---|
| H01Q 1/24 | (2006.01) | |
| H04M 1/02 | (2006.01) | |
| H01Q 9/04 | (2006.01) | |
| H01Q 5/378 | (2015.01) | |
| H01Q 5/40 | (2015.01) | |

(52) U.S. Cl.
CPC ............. *H04M 1/0202* (2013.01); *H01Q 1/243* (2013.01); *H01Q 5/378* (2015.01); *H01Q 5/40* (2015.01); *H01Q 9/0421* (2013.01)

(58) Field of Classification Search
CPC ......... H01Q 1/243; H01Q 5/40; H01Q 5/378; H01Q 9/0421
USPC .................................. 343/702, 700 MS, 846
See application file for complete search history.

(56) References Cited

U.S. PATENT DOCUMENTS

| | | | |
|---|---|---|---|
| 6,448,932 B1* | 9/2002 | Stoiljkovic et al. .... | 343/700 MS |
| 8,643,549 B2* | 2/2014 | Yamaki ................... | 343/700 MS |
| 8,963,780 B2* | 2/2015 | Hsu et al. ............... | 343/700 MS |
| 2003/0006936 A1* | 1/2003 | Aoyama et al. ......... | 343/700 MS |
| 2003/0098812 A1* | 5/2003 | Ying et al. ............... | 343/702 |
| 2003/0122718 A1* | 7/2003 | Fang et al. .............. | 343/702 |
| 2010/0231464 A1* | 9/2010 | Huang et al. ............ | 343/702 |
| 2011/0043408 A1* | 2/2011 | Shi et al. ................. | 343/700 MS |
| 2013/0241779 A1* | 9/2013 | Korva .................... | 343/700 MS |

* cited by examiner

*Primary Examiner* — Hoanganh Le
(74) *Attorney, Agent, or Firm* — Birch, Stewart, Kolasch & Birch, LLP

(57) ABSTRACT

A mobile device includes a main antenna and a hairpin element. The hairpin element is disposed adjacent to the main antenna, and substantially has a U-shape. The hairpin element is configured to increase bandwidth and antenna efficiency of the main antenna.

25 Claims, 8 Drawing Sheets

HAIRPIN ELEMENT FOR IMPROVING ANTENNA BANDWIDTH AND ANTENNA EFFICIENCY AND MOBILE DEVICE WITH THE SAME

BACKGROUND OF THE INVENTION

1. Field of the Invention

The subject application generally relates to a mobile device, and more particularly, relates to a mobile device for improving antenna bandwidth and antenna efficiency.

2. Description of the Related Art

With the progress of mobile communication technology, mobile devices, for example, portable computers, mobile phones, multimedia players, and other hybrid functional portable devices, have become more common To satisfy the demand of users, mobile devices usually perform wireless communication functions. Some devices cover a large wireless communication area, for example, mobile phones using 2G, 3G, LTE (Long Term Evolution) and 4G systems and using frequency bands of 700 MHz, 850 MHz, 900 MHz, 1800 MHz, 1900 MHz, 2100 MHz, 2300 MHz, and 2500 MHz. Some devices cover a small wireless communication area, for example, mobile phones using Wi-Fi, Bluetooth, WLAN (Wireless Local Area Networking), and WiMAX (Worldwide Interoperability for Microwave Access) systems and using frequency bands of 2.4 GHz, 3.5 GHz, 5.2 GHz, and 5.8 GHz.

Inside small mobile devices, since wireless communication antennas are disposed adjacent to other metal components, interference occurs therebetween, thus, negatively affecting their performance.

BRIEF SUMMARY OF THE INVENTION

In one exemplary embodiment, the subject application is directed to a mobile device, comprising: a main antenna; and a hairpin element, disposed adjacent to the main antenna, and substantially has a U-shape, wherein the hairpin element is configured to increase bandwidth and antenna efficiency of the main antenna.

BRIEF DESCRIPTION OF DRAWINGS

The subject application can be more fully understood by reading the subsequent detailed description and examples with references made to the accompanying drawings, wherein.

DETAILED DESCRIPTION OF THE INVENTION

In order to illustrate the purposes, features and advantages of the subject application, the embodiments and figures thereof in the subject application are shown in detail as follows.

Figure 1:
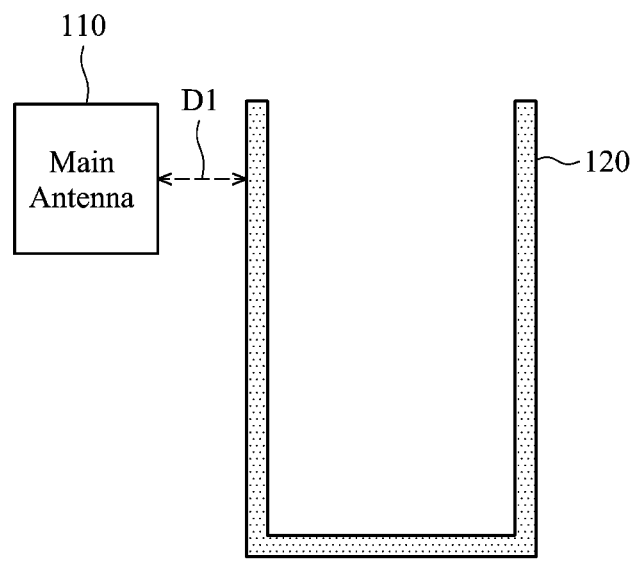
FIG. 1 is a diagram for illustrating a mobile device according to an embodiment of the invention.

FIG. 1 is a diagram for illustrating a mobile device 100 according to an embodiment of the invention. The mobile device 100 may be a smart phone or a tablet computer. As shown in FIG. 1, the mobile device 100 at least comprises a main antenna 110 and a hairpin element 120. The type of the main antenna 110 is not limited. In some embodiments, the main antenna 110 may be a PIFA (Planar Inverted F Antenna), a monopole antenna, a loop antenna, a patch antenna, a printed antenna, a chip antenna, or an LDS (Laser Direct Structuring) antenna. The hairpin element 120 may be made of a conductive material, such as silver, copper, iron, or aluminum.

The hairpin element 120 is disposed adjacent to the main antenna 110, and substantially has a U-shape and formed by at least three branches. The distance D1 between the main antenna 110 and the hairpin element 120 should be smaller than 10 mm. The hairpin element 120 is configured to increase bandwidth and antenna efficiency of the main antenna 110. In an embodiment, the hairpin element 120 is just an independent metal element. In another embodiment, the hairpin element 120 is configured as another antenna (e.g., a PIFA or a monopole antenna for receiving DTV (Digital Television) signals, GPS (Global Positioning System) signals, GSM (Global System for Mobile Communication) signals, CDMA (Code Division Multiple Access) signals, and LTE (Long Term Evolution) signals . . . etc.) independent of the main antenna 110. Note that the mobile device 100 may further comprise other essential components, such as a processor, an RF (Radio Frequency) module, a touch module, a display module, a power supply module, and a housing (not shown).

Figure 2A:
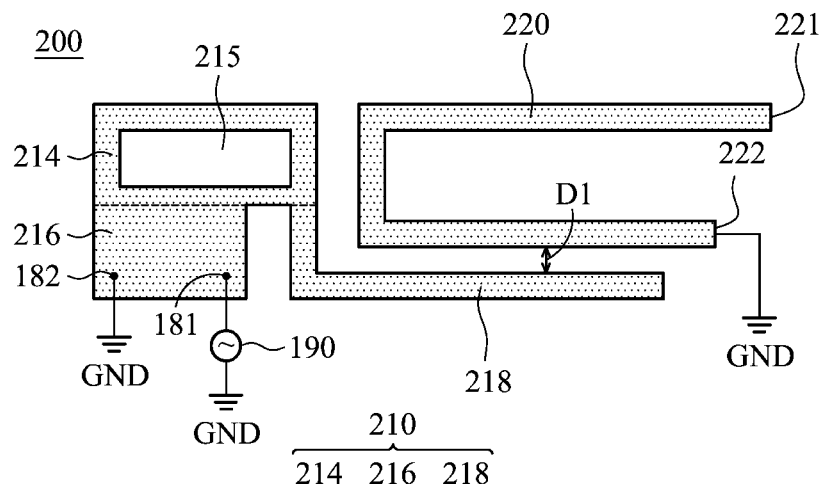
FIG. 2A is a diagram for illustrating a mobile device according to an embodiment of the invention.

FIG. 2A is a diagram for illustrating a mobile device 200 according to an embodiment of the invention. The mobile device 200 at least comprises a main antenna 210 and a hairpin element 220. As shown in FIG. 2A, one end of the hairpin element 220 is an open end 221, and another end of the hairpin element 220 is a grounding end 222 coupled to a ground voltage GND, wherein the hairpin element 220 is a shorting metal element for grounding. The ground voltage GND may be provided by a ground element, such as a metal ground plane. The hairpin element 220 has a resonant frequency, and the main antenna 210 operates at a working frequency. In the embodiment, the working frequency of the main antenna 210 is approximately (2N+1) times that of the resonant frequency of the hairpin element 220. For example, (2N+1) is equal to 3, 5, 7, or 9, and N is a positive integer. In a preferred embodiment, the working frequency is approximately 3 times that of the resonant frequency. As to element sizes, the length of the hairpin element 220 is approximately (2M+1)/4 times that of the wavelength of the working frequency. For example, (2M+1)/4 is equal to 3/4, 5/4, 7/4, or 9/4, and M is a positive integer. In a preferred embodiment, the length of the hairpin element 220 is approximately 3/4 times that of the wavelength of the working frequency. Note that since the main antenna 210 operates at a harmonic frequency of the hairpin element 220, in the invention, the hairpin element 220 does not negatively affect the main antenna 210, and further improves the bandwidth and the antenna efficiency of the main antenna 210.

Refer to FIG. 2A again. The main antenna 210 comprises an adjustment element 214, a feeding element 216, and an extension branch 218. The feeding element 216 has a feeding point 181 coupled to a signal source 190 and a grounding point 182 coupled to the ground voltage GND. In some embodiments, the feeding point 181 and the grounding point 182 are substantially positioned at two opposite corners of the feeding element 216, respectively. The adjustment element 214 is coupled to the feeding element 216 to adjust the impedance matching of the main antenna 210. An opening 215 is formed within the adjustment element 214. In some embodiments, the opening 215 substantially has a rectangular shape. The extension branch 218 is coupled to the adjustment element 214, and substantially extends away from the feeding element 216. The distance D1 between the extension branch 218 of the main antenna 210 and the hairpin element 220 should be smaller than 10 mm. In the embodiment, the adjustment element 214 substantially has a hollow rectangular shape, the feeding element 216 substantially has a rectangular shape, and the extension branch 218 substantially has an L-shape. However, the invention is not limited to the above. In other embodiments, the main antenna 210 may be implemented with other types of antennas having different shapes, and the performance thereof is also improved by the hairpin element 220.

Figure 2B:
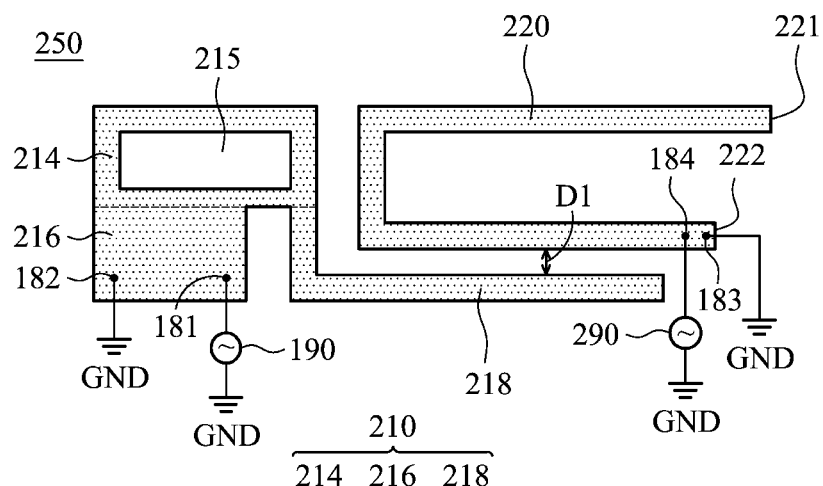
FIG. 2B is a diagram for illustrating a mobile device according to another embodiment of the invention.

FIG. 2B is a diagram for illustrating a mobile device 250 according to another embodiment of the invention. FIG. 2B is similar to FIG. 2A. The difference between the two embodiments is that the hairpin element 220 of the mobile device 250 further has a feeding point 184 coupled to another signal source 290. In addition, the feeding point 184 is positioned adjacent to a grounding point 183 of the grounding end 222 of the hairpin element 220. In the embodiment, the hairpin element 220 is configured as a PIFA, which is independent of the main antenna 210. The PIFA operates at another working frequency and has a resonant frequency. In some embodiments, the main antenna 210 operates at a first working frequency in a high band which is approximately from 2300 MHz to 2900 MHz (i.e., a Bluetooth/Wi-Fi band), and the PIFA (i.e., the hairpin element 220) operates at a second working frequency in a low band which is approximately from 700 MHz to 896 MHz (i.e., LTE and GSM bands). The hairpin element 220 provides the resonant frequency in the high band, and is configured as a diversity antenna from the main antenna 210 to improve the bandwidth and the antenna efficiency of the main antenna 210.

Figure 3A:
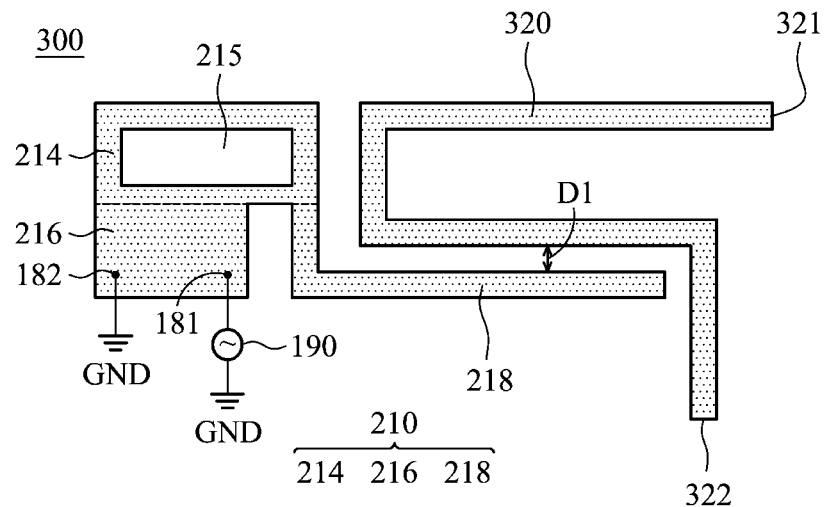
FIG. 3A is a diagram for illustrating a mobile device according to an embodiment of the invention.

FIG. 3A is a diagram for illustrating a mobile device 300 according to an embodiment of the invention. The mobile device 300 at least comprises a main antenna 210 and a hairpin element 320. FIG. 3A is similar to FIG. 2A. The difference between the two embodiments is that two ends of the hairpin element 320 of the mobile device 300 are both open ends 321 and 322 such that the hairpin element 320 is a floating metal element. The hairpin element 320 has a resonant frequency, and the main antenna 210 operates at a working frequency. In the embodiment, the working frequency is approximately 2N times that of the resonant frequency. For example, 2N is equal to 2, 4, 6, or 8, and N is a positive integer. In a preferred embodiment, the working frequency is approximately 2 times that of the resonant frequency. As to the size of elements, the length of the hairpin element 320 is approximately M/2 times that of the wavelength of the working frequency. For example, M/2 is equal to 1/2, 1, 3/2, or 2, and M is a positive integer. In a preferred embodiment, the length of the hairpin element 320 is approximately 1 time that of the wavelength of the working frequency. Similarly, the distance D1 between the extension branch 218 of the main antenna 210 and the hairpin element 320 should be smaller than 10 mm. Note that the main antenna 210 operates at a harmonic frequency of the hairpin element 320 and that in the invention, the hairpin element 320 may even be another antenna with another function in the same mobile device. When designed as the above, the hairpin element 320 may be an antenna operating in DTV, GSM, GPS, CDMA, or LTE bands. This design does not negatively affect the main antenna 210, and further improves the bandwidth and the antenna efficiency of the main antenna 210.

Figure 3B:
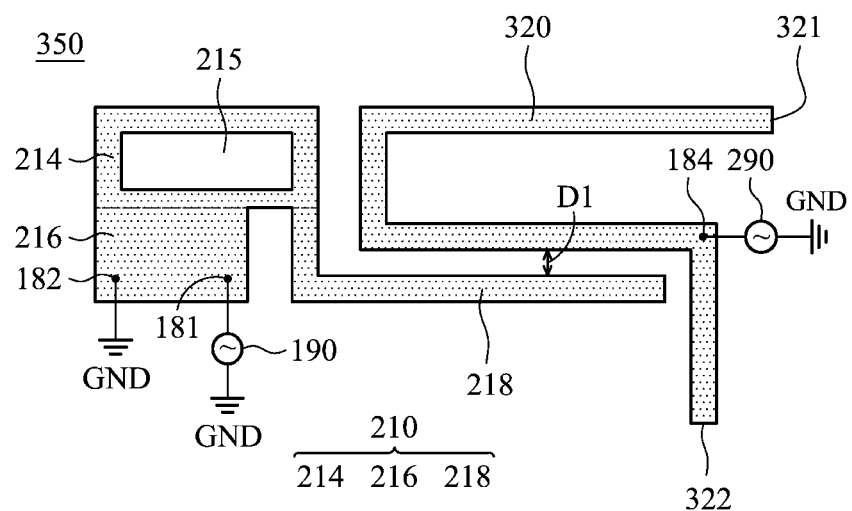
FIG. 3B is a diagram for illustrating a mobile device according to another embodiment of the invention.

FIG. 3B is a diagram for illustrating a mobile device 350 according to another embodiment of the invention. FIG. 3B is similar to FIG. 3A. The difference between the two embodiments is that the hairpin element 320 of the mobile device 350 further has a feeding point 184, which is adjacent to the extension branch 218 and is coupled to another signal source 290. In the embodiment, the hairpin element 320 is configured as a monopole antenna, which is independent of the main antenna 210. The monopole antenna operates at another working frequency and has a resonant frequency. In some embodiments, the main antenna 210 operates at a first working frequency in a high band which is approximately from 2300 MHz to 2900 MHz (i.e., a Bluetooth/Wi-Fi band), and the monopole antenna (i.e., the hairpin element 320) operates at a second working frequency in a low band which is approximately from 700 MHz to 896 MHz (i.e., LTE and GSM bands). The hairpin element 320 provides the resonant frequency in the high band, and is configured as a diversity antenna from the main antenna 210 to improve the bandwidth and the antenna efficiency of the main antenna 210.

Figure 4A:
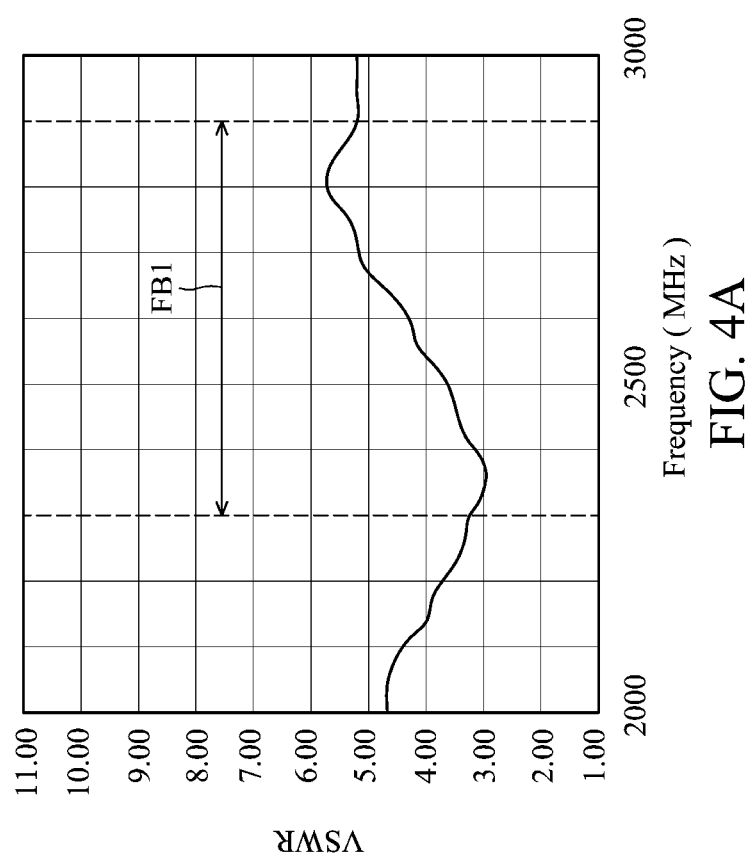
FIG. 4A is a diagram for illustrating a VSWR (Voltage Standing Wave Ratio) of a main antenna.

FIG. 4A is a diagram for illustrating a VSWR (Voltage Standing Wave Ratio) of the main antenna 210. The horizontal axis represents operation frequencies (MHz), and the vertical axis represents the VSWR. Without any hairpin element, the working frequency of the main antenna 210 is within a band FB1 which is approximately from 2300 MHz to 2900 MHz. In other words, the main antenna 210 is configured to cover the Bluetooth/WLAN/WiMAX/LTE bands.

Figure 4B:
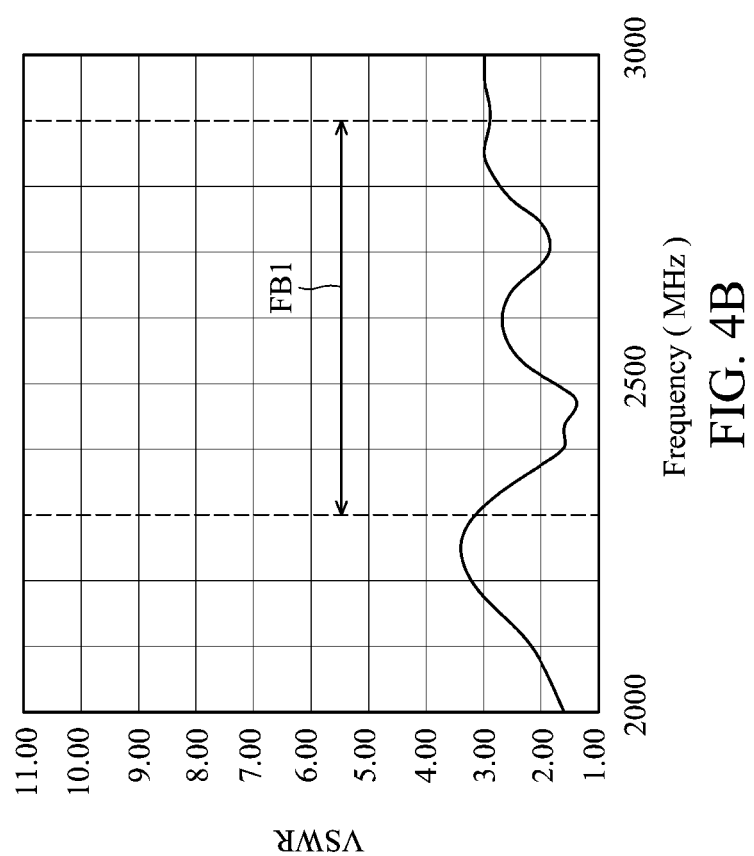
FIG. 4B is a diagram for illustrating a VSWR of a main antenna of a mobile device according to an embodiment of the invention.

FIG. 4B is a diagram for illustrating a VSWR of the main antenna 210 of the mobile device 200 according to an embodiment of the invention. The horizontal axis represents operation frequencies (MHz), and the vertical axis represents the VSWR. After the hairpin element 220 having the open end 221 and the grounding end 222 is incorporated into the mobile device 200, the working frequency of the main antenna 210 is still approximately from 2300 MHz to 2900 MHz, and the resonant frequency of the hairpin element 220 is approximately from 500 MHz to 2000 MHz. In comparison to FIG. 4A, the VSWR of the main antenna 210 of the mobile device 200 is apparently decreased in the band FB1. Accordingly, the hairpin element 220 of the invention can effectively improve the bandwidth and the antenna efficiency of the main antenna 210.

Figure 4C:
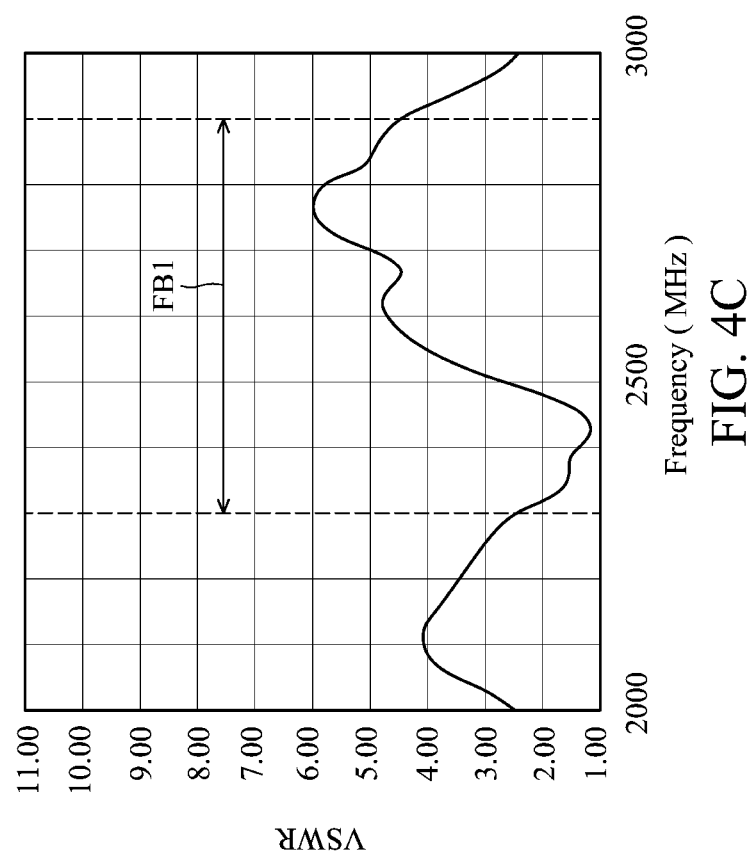
FIG. 4C is a diagram for illustrating a VSWR of a main antenna of a mobile device according to another embodiment of the invention.

FIG. 4C is a diagram for illustrating a VSWR of the main antenna 210 of the mobile device 300 according to another embodiment of the invention. The horizontal axis represents operation frequencies (MHz), and the vertical axis represents the VSWR. After the hairpin element 320 having the open ends 321 and 322 is incorporated into the mobile device 300, the working frequency of the main antenna 210 is still approximately from 2300 MHz to 2900 MHz, and the resonant frequency of the hairpin element 320 is approximately from 500 MHz to 2000 MHz. In comparison to FIG. 4A, the VSWR of the main antenna 210 of the mobile device 300 is apparently decreased in the band FB1. Accordingly, the hairpin element 320 of the invention can also effectively improve the bandwidth and the antenna efficiency of the main antenna 210.

According to FIG. 4B and FIG. 4C, the hairpin element of the invention can effectively improve the bandwidth and the antenna efficiency of the main antenna 210, as the hairpin element is designed at a specific position relative to the main antenna 210 wherein at least one branch of the hairpin element is positioned in parallel with the extension branch 218 such that the current passing through the branch, closed to the extension branch 218, of the hairpin element with respect to the current passing through the extension branch 218 of the main antenna 210, which have more overlapping current paths in a same direction there-between. The current paths begin from the open end of the extension branch 218 and the open end 221 of the hairpin element 220, and the currents on the current paths are transmitted by sine waveforms. Accordingly, if the number of the overlapping current paths in a same direction is increased, the bandwidth and the antenna efficiency of the main antenna 210 can be improved.

Figure 5:
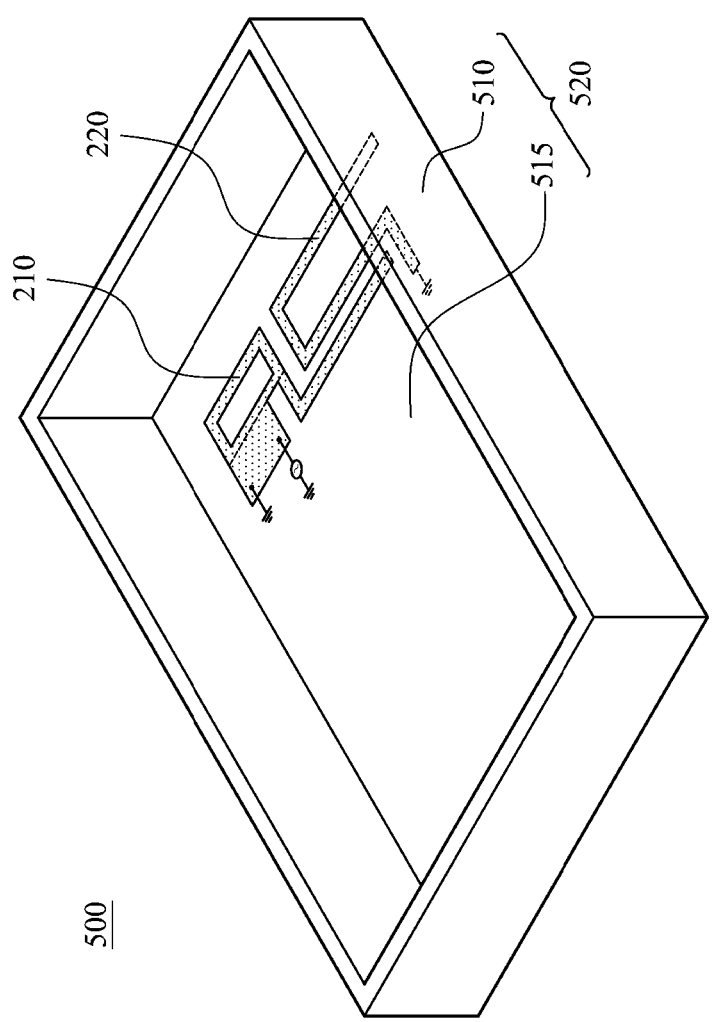
FIG. 5 is a diagram for illustrating a mobile device according to an embodiment of the invention.

FIG. 5 is a diagram for illustrating a mobile device 500 according to an embodiment of the invention. FIG. 5 is similar to FIGS. 2A and 2B. The difference between the two embodiments is that the mobile device 500 further comprises a housing 520. In an embodiment, the housing 520 is made of a nonconductive material and is formed as an AIO (All-In-One) structure. In another embodiment, the housing 520 comprises a side frame 510 and a back cover 515. The back cover 515 is made of a conductive or nonconductive material, and the side frame 510 is also made of a conductive or nonconductive material. The main antenna 210 and the hairpin element 220 may be disposed on the housing 520. In other words, the housing 520 is configured as a carrier for supporting the main antenna 210 and the hairpin element 220. The housing 520 may be a housing of a smart phone or a tablet computer. In some embodiments, the main antenna 210 and the hairpin element 220 are disposed on an FPCB (Flexible Printed Circuit Board) in the housing 520, or are formed on an inner or outer surface of the housing 520 by LDS (Laser Direct Structuring) or coating techniques. Note that the main antenna 210 and the hairpin element 220 may be at any position of the housing 520, and the only limitation is that the carrier is nonconductive. In addition, the main antenna 210 and the hairpin elements 220 and 320 of FIGS. 2A, 2B, 3A, and 3B may be applied to the embodiment of FIG. 5.

Figure 6:
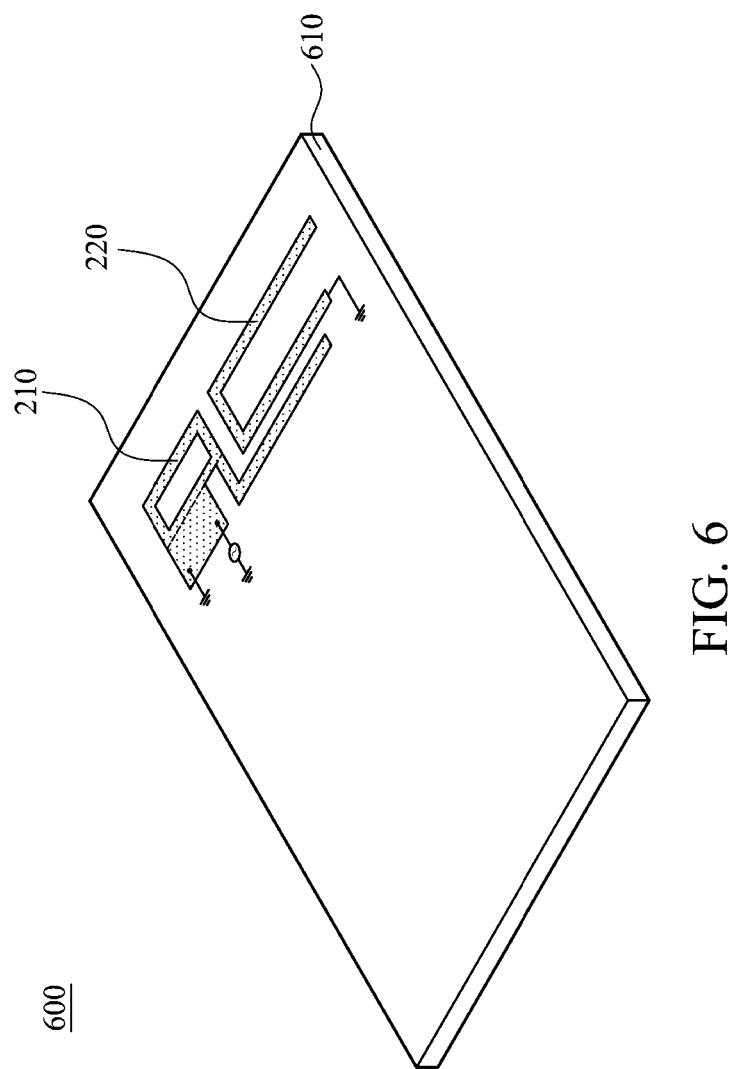
FIG. 6 is a diagram for illustrating a mobile device according to another embodiment of the invention.

FIG. 6 is a diagram for illustrating a mobile device 600 according to another embodiment of the invention. FIG. 6 is similar to FIGS. 2A and 2B. The difference between the two embodiments is that the mobile device 600 further comprises a dielectric substrate 610 and that the main antenna 210 and the hairpin element 220 are disposed on the dielectric substrate 610. The dielectric substrate 610 may be a system circuit board of the mobile device 600 or an FR4 substrate. If the dielectric substrate 610 has a high dielectric constant, the sizes of the main antenna 210 and the hairpin element 220 may be further reduced. Note that the main antenna 210 and the hairpin elements 220 and 320 of FIGS. 2A, 2B, 3A, and 3B may be applied to the embodiment of FIG. 6.

According to measurement results of some embodiments, initially, the TRP (Total Radiated Power) of the main antenna 210 is approximately equal to 6.6 dBm, and the TIS (Total Isotropic Sensitivity) thereof is approximately equal to −76.5 dBm. After the hairpin element 220 of FIG. 2 is included, the TRP of the main antenna 210 is increased to 13.2 dBm, and the TIS thereof is decreased to −82.7 dBm. On the other hand, after the hairpin element 320 of FIG. 3 is included, the TRP of the main antenna 210 is increased to 12.7 dBm, and the TIS thereof is decreased to −82.4 dBm. As a result, the hairpin elements 220 and 320 of the invention are both configured to improve the radiation performance of the main antenna 210, and do not interfere with the main antenna 210 even if the hairpin elements 220 and 320 are further configured as antennas. Since the hairpin elements 220 and 320 should not be disposed away from the main antenna 210, the problem of isolation is overcome. Thus, the invention can save the design space of mobile devices and may be implemented in a variety of small mobile devices.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
   a main antenna; and
   a hairpin element, disposed adjacent to the main antenna, and substantially has a U-shape,
   wherein the hairpin element is configured to increase bandwidth and antenna efficiency of the main antenna, and
   wherein the main antenna comprises:
      a feeding element substantially having a rectangular shape;
      an adjustment element coupled to the feeding element, the adjustment element substantially having a hollow rectangular shape; and
      an extension branch coupled to the adjustment element, and substantially extending away from the feeding element,
      wherein the feeding element, the adjustment element and the extension branch are coplanar.

2. The mobile device as claimed in claim 1, wherein a distance between the main antenna and the hairpin element is smaller than 10 mm.

3. The mobile device as claimed in claim 1, wherein one end of the hairpin element is an open end, and another end of the hairpin element is a grounding end.

4. The mobile device as claimed in claim 3, wherein the hairpin element has a resonant frequency, the main antenna operates at a working frequency, the working frequency is approximately (2N+1) times that of the resonant frequency, and N is a positive integer.

5. The mobile device as claimed in claim 4, wherein the working frequency is approximately 3 times that of the resonant frequency.

6. The mobile device as claimed in claim 5, wherein the resonant frequency is approximately from 500 MHz to 2000 MHz, and the working frequency is approximately from 2300 MHz to 2900 MHz.

7. The mobile device as claimed in claim 4, wherein a length of the hairpin element is approximately (2M+1)/4 times that of a wavelength of the working frequency, and M is a positive integer.

8. The mobile device as claimed in claim 7, wherein the length of the hairpin element is approximately ¾ times that of the wavelength of the working frequency.

9. The mobile device as claimed in claim 3, wherein the hairpin element further has a feeding point coupled to a signal source, and the hairpin element is configured as a PIFA (Planar Inverted F Antenna), which is independent of the main antenna.

10. The mobile device as claimed in claim 9, wherein the feeding point of the hairpin element is adjacent to the grounding end of the hairpin element.

11. The mobile device as claimed in claim 9, wherein the main antenna operates at a first working frequency, the PIFA operates at a second working frequency, the first working frequency is approximately from 2300 MHz to 2900 MHz, and the second working frequency is approximately from 700 MHz to 896 MHz.

12. The mobile device as claimed in claim 1, wherein two ends of the hairpin element are both open ends.

13. The mobile device as claimed in claim 12, wherein the hairpin element has a resonant frequency, the main antenna operates at a working frequency, the working frequency is approximately 2N times that of the resonant frequency, and N is a positive integer.

14. The mobile device as claimed in claim 13, wherein the working frequency is approximately 2 times that of the resonant frequency.

15. The mobile device as claimed in claim 14, wherein the resonant frequency is approximately from 500 MHz to 2000 MHz, and the working frequency is approximately from 2300 MHz to 2900 MHz.

16. The mobile device as claimed in claim 13, wherein a length of the hairpin element is approximately M/2 times that of a wavelength of the working frequency, and M is a positive integer.

17. The mobile device as claimed in claim 16, wherein the length of the hairpin element is approximately 1 time that of the wavelength of the working frequency.

18. The mobile device as claimed in claim 12, wherein the hairpin element further has a feeding point coupled to a signal source, and the hairpin element is configured as a monopole antenna, which is independent of the main antenna.

19. The mobile device as claimed in claim 12, wherein the main antenna operates at a first working frequency, the monopole antenna operates at a second working frequency, the first working frequency is approximately from 2300 MHz to 2900 MHz, and the second working frequency is approximately from 700 MHz to 896 MHz.

20. The mobile device as claimed in claim 1, wherein the extension branch substantially has an L-shape.

21. The mobile device as claimed in claim 1, wherein the hairpin element is configured as another antenna, which is independent of the main antenna.

22. The mobile device as claimed in claim 1, further comprising: a housing, wherein the main antenna and the hairpin element are disposed on the housing.

23. The mobile device as claimed in claim 22, wherein the housing comprises a side frame and a back cover, and the side frame and the back cover are made of conductive or nonconductive materials.

24. The mobile device as claimed in claim 22, wherein the main antenna and the hairpin element are formed on an inner or an outer surface of the housing by LDS (Laser Direct Structuring) or coating techniques.

25. The mobile device as claimed in claim 1, further comprising: a dielectric substrate, wherein the main antenna and the hairpin element are disposed on the dielectric substrate.

* * * * *